Patented Dec. 7, 1937

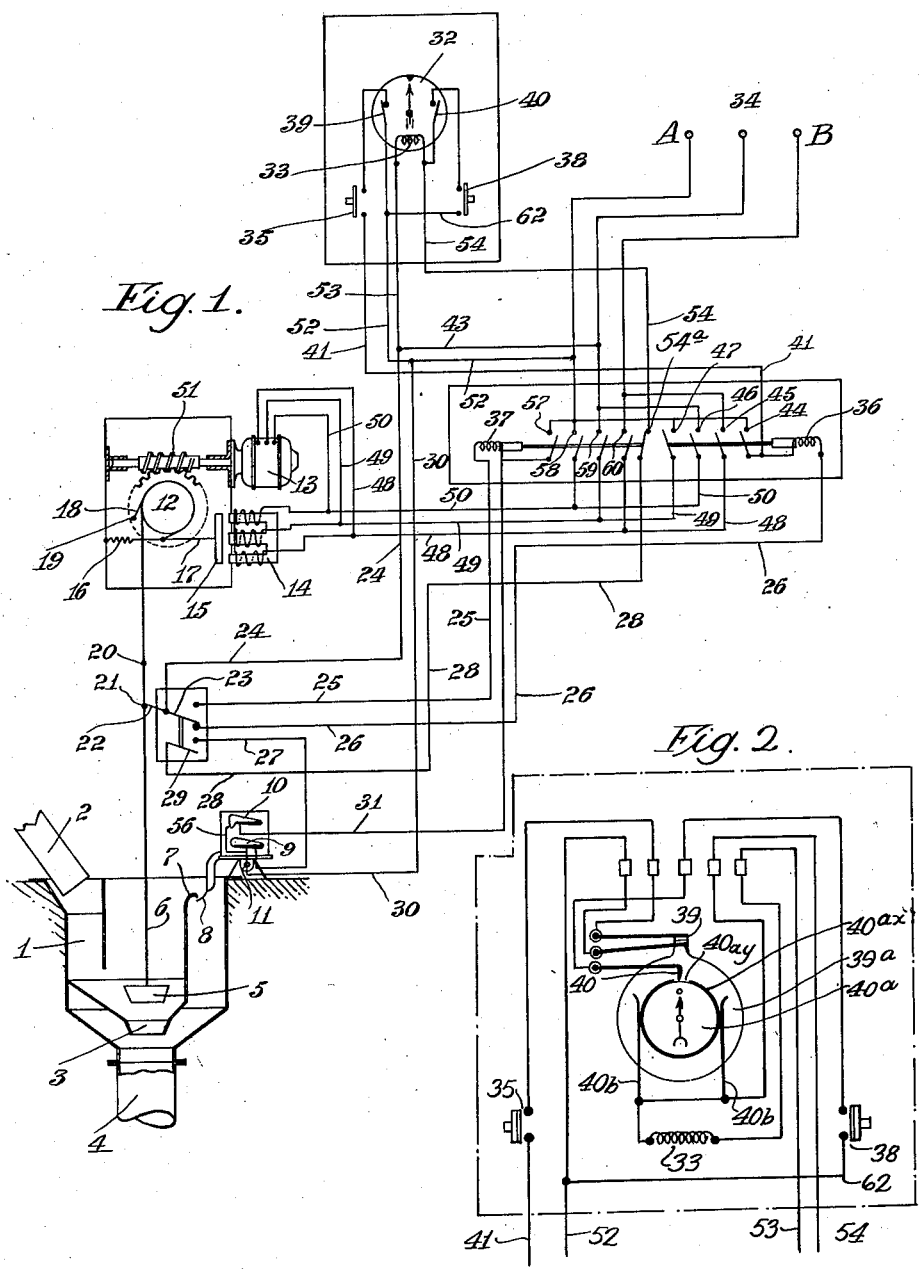

2,101,257

UNITED STATES PATENT OFFICE 2,101,257

APPARATUS FOR MEASURING LIQUID OR FLUENT MATERIALS

Mikael Vogel-Jorgensen, Frederiksberg, near Copenhagen, Denmark, assignor to F. L. Smidth & Co., New York, N. Y., a corporation of New Jersey Application August 17, 1935, Serial No. 36,659
In Great Britain August 18, 1934

4 Claims. (Cl. 73—223)

This invention relates to apparatus for measuring flowing liquid or fluent materials, and may be applied with advantage to the measurement of cement slurry fed to a rotary kiln plant or unit for burning cement. In such a plant it is important that the burner should be able periodically to check the amount of material fed to the kiln and accordingly a measuring vessel has often been inserted in the slurry pipe line and has been provided with a closable opening in its bottom. Then the opening is closed, for example by means of a plug, when it is desired to take a measurement, and either the time taken for the slurry to reach a certain level has been measured, or the flow of the slurry to the vessel has been stopped after the lapse of a predetermined period of time and the amount of slurry in the vessel has been measured by means of a measuring stick. However, in order to take such measurements the burner must leave his post at the outlet end of the kiln and proceed to the feed end, which is often four hundred feet away from the outlet end, and if he is to obtain accurate measurements he must spend several minutes at the feed end. Alternatively the measurements must be taken by another operator.

The present invention aims at overcoming these drawbacks by remote control of the measurements. Moreover, by providing automatic control from a remote point the invention ensures a higher degree of accuracy than can be obtained by means of hand measurement or visual observation.

According to the invention the material to be measured is introduced into a measuring vessel furnished with a closable opening in its bottom, and the closing member for this opening is actuated by an electrically-driven mechanism that is operated from a remote control point when measuring is to begin, and that is thereafter automatically controlled through switches in accordance with the condition of the vessel. In addition means are provided for automatically transmitting to the remote control point an indication of the period of time that is taken by the entry of a predetermined quantity of material into the measuring vessel.

The closing member for the measuring vessel may take any desired form, but is preferably a plug or other valve member carried by a rod that is moved by the rotation of a drum driven by an electric motor. The closing member may advantageously actuate three switches, one of which serves to stop the driving mechanism directly the opening in the measuring vessel has been closed, another of which serves to start a clock at the remote control point so as to measure the time occupied by the entry of the predetermined quantity of material into the measuring vessel, and the third of which serves to stop the driving mechanism when the opening has been completely opened again at the end of the measurement. The driving mechanism may advantageously be started to open the opening when the predetermined quantity of material has entered the measuring vessel and the clock may be stopped at this moment by a switch or switches.

In order that the invention may be clearly understood and readily carried into effect one apparatus constructed in accordance therewith will now be described by way of example with reference to the accompanying diagrammatic drawing in which:

Figure 1 illustrates the relations of the elements and connections just before a measurement is taken.

Figure 2 is a representation on a larger scale of some details which it is not practicable to show in Figure 1 because of the confusion which would be occasioned, such details being concerned particularly with the clock shown in Figure 1.

The apparatus is designed to measure slurry as it flows on its way to a rotary kiln. The slurry is delivered through a pipe 2 to a measuring vessel 1 in the bottom of which there is an opening 3 delivering to a pipe 4 so that normally the slurry simply flows through the measuring vessel. A plug or valve member 5 carried by a rod 6 suspended by a cord or cable is provided to close the opening 3 when a measurement is to be taken. When the opening 3 is closed by the plug 5 the slurry will rise in the measuring vessel until it overflows at 7 whereupon it hits a projection 8. This projection and also two mercury switches 9 and 10 mounted rigidly with it are thus caused to rock about a shaft 11. The effects produced by the movements of those switches will be described below.

It will be observed that the mercury switches 9 and 10 are rigidly mounted in a support which is pivotally mounted on a rocking shaft 11. The support is further provided with a projection piece 8 which depends therefrom and reaches to a point just below the overflow lip 7 of the measuring vessel 1. The support is so balanced that it normally maintains the position of rest shown in Figure 1 and under which condition the circuit through mercury switch 10 is opened while that of the mercury switch 9 is closed.

The slurry overflows over lip 7 when the measuring tank has been completely filled and the discharging slurry strikes projection 8, exerting a force thereon sufficient to tip the switch support counterclockwise whereby mercury switch 10 closes its circuit while mercury switch 9 opens.

As soon as plug 5 is lifted again permitting the slurry to discharge from the measuring vessel the slurry ceases to overflow over lip 7 and no further force is exerted on projection 8. The support, therefore, returns to its former position of rest as indicated in Figure 1.

The burner in charge of the kiln plant or unit is normally occupied at the outlet end of the kiln and operation of the apparatus is controlled from this point. When a measurement is to be taken a switch 35 at the remote control point is closed manually. This energizes a solenoid relay 36, the current both for this purpose and for the operation of the other electrical parts of the apparatus being supplied from a source of alternating current 34. The circuit for energizing the solenoid relay 36 may be traced as follows: starting with one side, which has been designated by the reference character A, of a three phase source of alternating current 34, thence conductor 52, switches 39 and 35, lead 41, relay 36, lead 26, arm 23, leads 24 and 43 to the middle conductor of the source of alternating current 34. The energization of the relay 36 completes a locking circuit for itself through contact 44 thus maintaining the circuits controlled by said relay until interrupted as hereinafter explained. The result of the energization of relay 36 is to close the circuits of an electrical motor 13 and of an electromagnet 14 through the closures of contacts 45, 46 and 47, and leads 48, 50 and 49, respectively, with the effect that the motor 13 is set in operation and the armature 15 of the electromagnet 14 is attracted. The motor 13 through a worm gear 51 drives a drum 12 on which is wound a cable connected to the rod 6 so that when the motor starts the drum 12 winds off some of the cable and thus allows the rod 6 and the plug 5 to move downwards to close the opening 3. The drum is engaged by a brake band 18 which is secured at one end at a point 19 and at the other end to a rod 17 which is urged by a spring 16 away from the electromagnet 14 thus normally applying the brake band by holding the armature 15 away from its electromagnet 14. When the electromagnet 14 is energized simultaneously with the starting of the motor 13, the armature 15, as mentioned above, is attracted and the brake is released so that the drum can rotate in the manner described.

As the rod 6 moves downwards a projection 20 carried by it engages one arm 22 of a two-armed lever and rocks the lever so that the other arm 23 closes a circuit from a lead 24 to a lead 25, and at the same time breaks the circuit that was previously closed between leads 24 and 26. An arm 29 rigid with the arm 23 also closes a circuit between leads 27 and 28 thus effecting the operation of the clock 32 as described later. The projection 20 is placed at such a height on the rod 6 that the circuits just mentioned are respectively closed and broken just as the plug 5 completely closes the opening 3. The result of the breaking of the circuit through the leads 24 and 26 is to energize the relay 36 so that the circuits of the motor 13 and the electromagnet 14 are broken and the brake band 18 is at once tightened around the drum 12 by means of the spring 16, so that the drum is stopped practically instantaneously. The closure of the circuit through the clock 32 may be traced as follows: starting with the middle conductor of the source of the alternating current 34, conductors 43 and 53, through the winding of a small synchronous motor 33, lead 54, contact 54ª, lead 28, arm 29, lead 27, switch 9, leads 30 and 52, back to the A side of the alternating source of current.

The result of the closing of the circuit through leads 24 and 25 is to make the relay 37, which is similar to the relay 36, ready to be energized, the circuit for which will be hereinafter described. The effect of closing the circuit through leads 27 and 28 as mentioned above is to start the clock 32 at the remote control point, and since this clock driven by the synchronous motor 33 which is included in the circuits 27 and 28, and which, if the frequency of the source of the alternating current 34 is time-controlled, will keep the clock completely accurate. Thus the clock is going during the whole time that the measuring vessel 1 is being filled with slurry. When the slurry overflows at the point 7 and it hits the projection 8 and actuates the mercury switches 9 and 10, as described above, the actuation of the switch 9 serves by breaking the circuit through leads 27 and 30 to stop the synchronous motor 33, and thus the clock 32, so that the clock shows the exact time taken to fill the measuring vessel 1.

The actuation of the switch 10 serves to close a circuit to energize the relay 37, which may be described as follows: starting with the A side of the source of the alternating current 34, through leads 52, 30 and 56, switch 10, lead 31, the winding of relay 37, lead 25, arm 23, leads 24 and 43, back to the central conductor of the source of the alternating current. This establishes a locking circuit for the relay 37 through the contact 57 which maintains it energized while functioning. The closure of contacts 58, 59 and 60 effects the completion of circuits through the motor 13 and the electromagnet 14, but this time the motor 13, which is reversible, is driven in the opposite direction so that the drum 12 is rotated to lift the plug 5 away from the opening 3. When the plug 5 has been lifted to a sufficient extent a projection 21 on the rod 6 engages the lever 22 and thus rocks the switch members 23 and 29 so that the circuits are broken and the circuit through leads 24 and 26 is again established. This operation results in the deenergization of the relay 37, and accordingly in stopping of the motor 13 and in a restoration of the other circuits to normal state, i. e., for the beginning of another measurement. The switches 9 and 10 tilt back to their normal position as soon as the slurry ceases to flow over at point 7.

The clock 32 is set back to its zero position by the manual actuation of a switch 38, which when closed establishes the following circuit: starting with the A conductor of the source of alternating current 34, leads 52, 62, switches 38, 40, the winding of motor 33, leads 53, 43, to the central conductor of the source of current 34. The clock is provided with two safety switches 39 and 40, the switch 39 ensuring that the switch 35 cannot be effective unless the clock 32 is at the zero position, and the switch 40 ensuring that the switch 38 cannot be effective when the clock is at the zero position.

On the pointer shaft of the clock 32 are mounted two discs 39ª and 40ª. Disc 39ª is in the form of a cam, which, when the clock is in its zero position, maintains switch 39 in closed position, but as soon as the disc revolves, permits the switch contacts to be broken until a complete revolution has been made, that is, when the clock is reset to zero position.

Disc 40ᵃ is provided on its periphery with an electrical conductor in the form of a metal strip or wire 40ᵃˣ which is interrupted at one point, as at 40ᵃʸ. Sliding collector contacts 40ᵇ bear against the conductor and since there are two of these the interruption of the conductor will not break the circuit connected to said contacts.

When the clock is at zero position switch contact point 40 rests in the space where the peripheral conductor has been interrupted but as soon as the clock is placed in operation the disc 40ᵃ will rotate and the contact point of switch 40 will bear upon the conductor thereby closing the circuit through switch 40.

Tracing the associated wires of Figure 2 in conjunction with those of Figure 1 it will be seen that unless the clock is in zero position the pressing of push-button 35 will not complete the circuit for motor 13 and the plug cannot be lowered.

It will also be seen that pressing push-button 38 after a reading has been taken will reclose the circuit for the synchronous motor of the clock through the peripheral conductor of disc 40ᵃ and contactors 40ᵇ, and permit the clock pointer to continue to revolve until the zero position has been reached. As the peripheral conductor is interrupted just when this position is reached the clock motor circuit is re-opened even if the operator by mistake should continue to press push-button 38. At the same time switch 39 is reclosed and in readiness to repeat the entire operation of measuring the rate of flow.

It will be understood that the invention is not limited to the mechanical and electrical details described. For instance, the switches, relays and so forth may be of quite different types, while the electrical connections may also be varied. The time occupied by the measurement as indicated by the clock 32 can, if desired, be recorded by means of an automatic recorder of known construction and not necessary to be shown or described.

It will be understood that various details of construction and arrangement can be made to suit different conditions of use and that, except as pointed out in the accompanying claims, the invention is not restricted to any of the particular constructions and arrangements shown and described herein.

I claim as my invention:

1. An apparatus for use in measuring liquids or fluent materials comprising a measuring vessel into which the material flows, such vessel having an outlet for the material, a valve member for controlling the outlet, an electrically driven mechanism for actuating the valve member, a control circuit for initiating the operation of said mechanism to cause the valve member to close the outlet, means to stop said mechanism as the outlet is closed, a second circuit and connections for effecting operation of said mechanism in reverse to open the outlet, means actuated by accumulation of material in the vessel to close the last named circuit and cause said mechanism to move the valve member to open the outlet, a clock device, means independent of said mechanism controlled by the closure of the valve member to start the clock device, and means actuated by the accumulation of material in the vessel to stop the clock device.

2. An apparatus for use in measuring liquids or fluent materials comprising a measuring vessel into which the material flows, such vessel having an outlet for the material, a valve member for controlling the outlet, a vertically reciprocating rod carrying the valve member, an electrically driven mechanism operatively connected with the rod, a control circuit for initiating the operation of said mechanism to cause the rod to move in a direction to close the outlet, means the operation of which is initiated by the movement of the rod to stop said mechanism as the outlet is closed, a second circuit and connections for effecting operation of said mechanism to move the rod in a direction to cause the valve member to open the outlet, means the operation of which is initiated by the movement of the rod to stop said mechanism as the outlet is opened, a clock device, means independent of said mechanism controlled by the closure of the valve member to start the clock device, and means actuated by the accumulation of material in the vessel to close the second named circuit.

3. An apparatus for use in measuring liquid or fluent materials comprising a measuring vessel into which the material flows, such vessel having an outlet for the material, a valve member for controlling the outlet, a vertically reciprocating rod carrying the valve member, an electrically driven mechanism operatively connected with the rod, a manually controlled circuit for initiating the operation of said mechanism to cause the rod to move in a direction to close the outlet, a switch included in the manually controlled circuit and opened to stop said mechanism by the rod in its movement to close the outlet, a second circuit and connections for effecting operation of said mechanism to cause the rod to move in a direction to open the outlet, a clock device, means independent of said mechanism controlled by the closure of the valve member to start the clock device, and means actuated by the accumulation of material in the vessel to close the last named circuit.

4. An apparatus for use in measuring liquids or fluent materials comprising a measuring vessel into which the material flows, such vessel having an outlet for the material, a valve member for controlling the outlet, a vertically reciprocating rod carrying the valve member, an electrically driven mechanism operatively connected with the rod and including a motor, a manually controlled circuit for initiating the operation of the motor in one direction to move the rod in a direction to close the opening, a switch adapted to be moved by the rod when moving in one direction to open the first named circuit and stop the motor, a circuit for effecting operation of the motor in the opposite direction to open the outlet, a switch included in said last named circuit, a clock device, means controlled by the closure of the valve member to start the clock device and means actuated by the accumulation of material in the vessel to move the last named switch to close said last named circuit.

MIKAEL VOGEL-JORGENSEN.